United States Patent
Itahashi et al.

(10) Patent No.: US 9,511,309 B2
(45) Date of Patent: Dec. 6, 2016

(54) MIXED LIQUID SEPARATION APPARTUS

(71) Applicant: RIX CORPORATION, Fukuoka (JP)

(72) Inventors: Yuki Itahashi, Fukuoka (JP); Yoshitaka Kimura, Fukuoka (JP)

(73) Assignee: RIX CORPORATION, Fukuoka (JP)

( * ) Notice: Subject to any disclaimer, the term of this patent is extended or adjusted under 35 U.S.C. 154(b) by 100 days.

(21) Appl. No.: 14/425,264

(22) PCT Filed: Sep. 2, 2013

(86) PCT No.: PCT/JP2013/073561
§ 371 (c)(1),
(2) Date: Mar. 2, 2015

(87) PCT Pub. No.: WO2014/038518
PCT Pub. Date: Mar. 13, 2014

(65) Prior Publication Data
US 2015/0217210 A1   Aug. 6, 2015

(30) Foreign Application Priority Data
Sep. 5, 2012  (JP) ................. 2012-195190

(51) Int. Cl.
*B01D 17/032*   (2006.01)
*B01D 17/02*    (2006.01)
(Continued)

(52) U.S. Cl.
CPC .......... *B01D 17/0214* (2013.01); *B01D 1/222* (2013.01); *B01D 17/0202* (2013.01);
(Continued)

(58) Field of Classification Search
CPC .... B01D 17/0214; B01D 21/2433; C02F 1/40; B23Q 11/1069
(Continued)

(56) References Cited

U.S. PATENT DOCUMENTS 4,052,311 A * 10/1977 Martin ............... B01D 21/2416
                                                          210/523
4,235,726 A * 11/1980 Shimko .............. B01D 21/2433
                                                          210/523
(Continued)

FOREIGN PATENT DOCUMENTS

WO   2005/038408 A2   4/2005

OTHER PUBLICATIONS

English translation of International Search Report corresponding to PCT/JP2013/073561 mailed Oct. 29, 2013, 2 pages.

*Primary Examiner* — Christopher Upton
(74) *Attorney, Agent, or Firm* — Kilpatrick Townsend & Stockton LLP

(57) ABSTRACT

This mixed liquid separation apparatus separates and extracts an oil and fat component, which has a lower specific gravity and higher viscosity than a coolant, from a mixed liquid in which the oil and fat component forms a surface layer as a result of floating to the surface of the coolant. The mixed liquid separation apparatus has a liquid separation and transfer part that is composed of a helical body, a shaft and rotary drive part. The liquid separation and transfer part is disposed in a vertical orientation such that the bottom of liquid separation and transfer part is inserted in a storage tank, which stores the mixed liquid, and separates the oil and fat component from the coolant and transfers said oil and fat component upward. The helical body has an inner end surface that is disposed so as to allow a band member, which is in sliding contact with the outer circumferential surface of the shaft, to orbit in a helical manner in a plurality of stages along the outer peripheral surface of the cylindrical rod-like shaft. The oil and fat component, which adheres to the band member, is pushed up along the outer circumferential sur-
(Continued)

face of the shaft due to the relative rotation of the helical body and the shaft.

10 Claims, 7 Drawing Sheets

(51) Int. Cl.
    *C02F 1/40*     (2006.01)
    *B23Q 11/10*     (2006.01)
    *B01D 1/22*     (2006.01)

(52) U.S. Cl.
    CPC ...... *B01D 17/0217* (2013.01); *B23Q 11/1069* (2013.01); *C02F 1/40* (2013.01)

(58) Field of Classification Search
    USPC .......................... 210/523, 525, 540, 776, 171
    See application file for complete search history.

(56) References Cited

U.S. PATENT DOCUMENTS

| | | | | |
|---|---|---|---|---|
| 4,797,205 | A * | 1/1989 | Kitamura | B01D 17/0214 210/171 |
| 5,160,638 | A * | 11/1992 | Petkovic | E02B 15/105 210/776 |
| 5,676,827 | A * | 10/1997 | Bruke | B01D 21/2461 210/523 |
| 5,827,425 | A * | 10/1998 | McKinnon | B01D 17/0214 210/540 |
| 2002/0166803 | A1 | 11/2002 | Mazurek et al. | |
| 2005/0045542 | A1* | 3/2005 | Hobson | B01D 21/2433 210/776 |
| 2007/0144964 | A1* | 6/2007 | Isogai | B01D 17/041 210/512.1 |
| 2012/0152817 | A1 | 6/2012 | Dague | |

* cited by examiner

MIXED LIQUID SEPARATION APPARTUS

TECHNICAL FIELD

The present invention relates to a mixed liquid separation apparatus which separates predetermined substances from a mixed liquid with different types of components after washing, lubrication, etc. in machine tools and other factory facilities.

BACKGROUND ART

In the machining and other manufacturing fields, a coolant, which is mostly comprised of industrial use water, has been used for various purposes, such as lubrication and cooling at the time of machining, and washing and degreasing after machining. These coolants have cutting fluid, cleaning solution, and other various components added in accordance with the purpose of use. After use, they are recovered in the state of a waste liquor in which swarf and the oil for lubrication use are mixed. The recovered waste liquor is recirculated for use after removing the foreign matter. As the apparatus for such waste liquid treatment, in the past, various types of apparatuses have been used (for example, see PLT 1).

The prior art which is shown in this PLT 1 employs the following screw pipe type of liquid separation mechanism. At the inside of a cylindrical outside member, a rod-shaped inside member which rotates relative to the outside member is coaxially arranged. A spiral-shaped guide partition, which is provided at the outer circumference of the inside member, is made to slidingly contact the inner circumferential surface of the outside member. At the time of operation, the bottom part of the screw pipe is immersed in the mixed liquid to be separated. In that state, the outside member and the inside member are made to rotate relative to each other. Due to this, the guide partition slidingly contacts the inner circumferential surface of the outside member while rotating. The oil which floats on the surface of the mixed liquid and other substances for separation are transported upward along the spiral surface of the guide partition to be separated and recovered.

CITATIONS LIST

Patent Literature

PLT 1: WO2005/038408A2

SUMMARY OF INVENTION

Technical Problem

However, the above prior art suffered from the following problems, when used for a cutting machine or other mechanical apparatus which produces swarf, sludge, or other solid foreign matter. In such a mechanical apparatus, the mixed liquid to be treated contains not only the floating oil to inherently be separated, but also swarf, sludge, and other solid foreign matter. For this reason, if making the above-mentioned liquid separation mechanism operate, such solid foreign matter deposits on the spiral-shaped guide partition together with the oil. If operating the screw pipe in a state with such solid foreign matter deposited, in the process of making the solid foreign matter move upward along the guide partition, the solid foreign matter is caught between the sliding contact parts of the guide partition and outside member, resulting in the problem of clogging. Such clogging not only obstructs recovery of oil and lowers the efficiency of the apparatus, but also causes poor operation of the screw pipe and abnormal wear due to the caught foreign matter and results in shorter part lifetime and higher cost of the apparatus. As explained above, in the prior art, there was the problem that it was difficult to realize low cost, high liquid separation efficiency for a mixed liquid containing swarf, sludge, and other solid foreign matter.

The present invention was made in consideration of these problems and has as its object the provision of a mixed liquid separation apparatus which treats a mixed liquid which contains swarf, sludge, and other solid foreign matter and realizes low cost, high liquid separation efficiency.

Solution to Problem

The mixed liquid separation apparatus of the present invention is a mixed liquid separation apparatus for separating and taking out a second substance from a mixed liquid containing at least two types of liquid substances with different viscosities and specific gravities, wherein said second substance floats on a surface of a first substance among said liquid substances and forms a surface layer of said second substance with a specific gravity smaller than said first substance and a viscosity higher than said first substance, comprising a liquid separation and transport part, which is arranged in a vertical posture with a bottom part inserted into a storage tank which stores said mixed liquid, separates said second substance from said first substance and transports said second substance upward, and a liquid recovery part which recovers said transported second substance in a receptacle, wherein said liquid separation and transport part comprises a columnar rod-shaped shaft part, a spiral member which is provided with a band member with an inside end face, wherein said inside end face slidingly contacts an outer circumferential surface of said shaft part and said spiral member circles around said outer circumferential surface in a spiral shape in several turns, and a rotation drive part which makes said spiral member and said shaft part rotate relative to each other, and wherein said second substance deposited on said band member is pushed up by said relative rotation along said outer circumferential surface of said shaft part.

Advantageous Effects of Invention

According to the present invention, the mixed liquid separation apparatus, wherein the second substance is separated and taken out from the mixed liquid in a state where the second substance floats on a surface of the first substance and the second substance forms a surface layer of the second substance with a specific gravity smaller than the first substance and a viscosity higher than it, has the following. That is, the liquid separation and transport part is arranged in a vertical posture with a bottom part inserted into a storage tank which stores the mixed liquid, and separates the second substance from the first substance and transports it upward. This liquid separation and transport part is comprised of a columnar rod-shaped shaft part, a spiral member which is provided with a band member with an inside end face which slidingly contacts the outer circumferential surface of the shaft part and circling around the outer circumferential surface in a spiral shape in several turns, and a rotation drive part which makes these rotate relative to each other. Due to this, it is possible to push up the second substance, which is deposited on the band member by relative rotation along the outer circumferential surface of the shaft part, and possible to realize low cost, high liquid separation efficiency for a mixed liquid which contains swarf, sludge, and other solid foreign matter.

DESCRIPTION OF EMBODIMENTS

Figure 1:
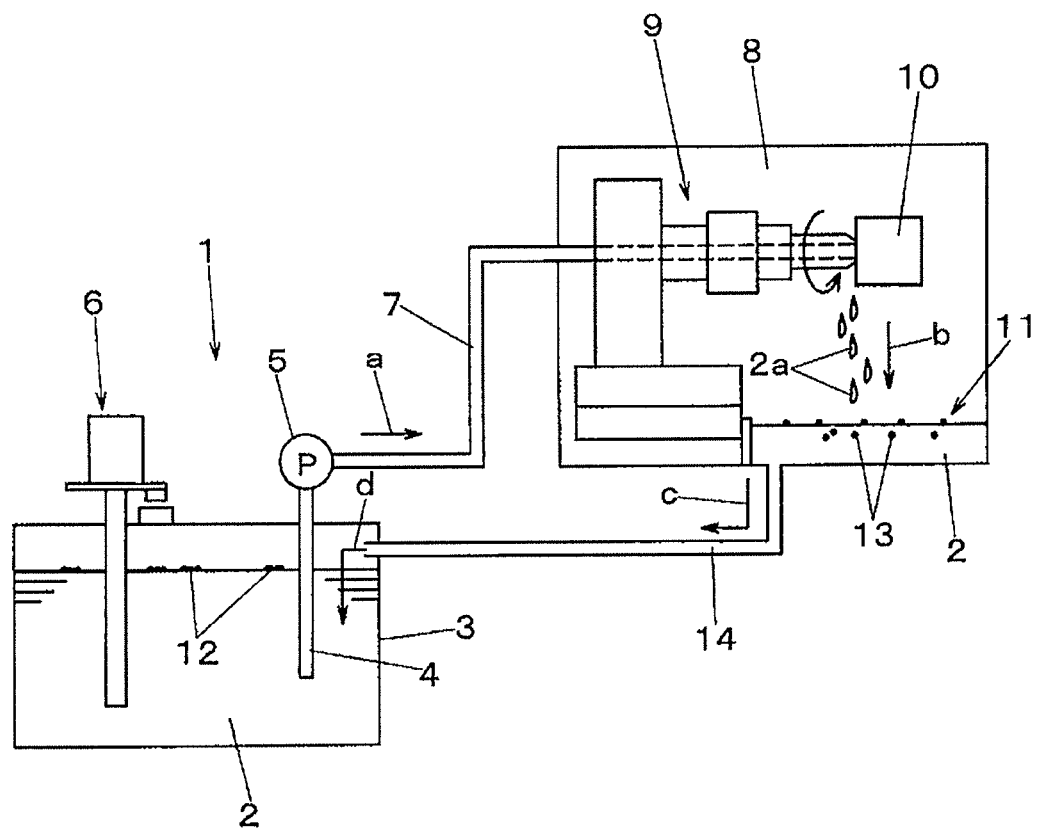
FIG. 1 is an explanatory view for explaining a liquid treatment system of a mixed liquid separation apparatus of one embodiment of the present invention.

Embodiments of the present invention will be explained with reference to the drawings. Note that the reference notations are examples which show correspondence with specific means which are described in the embodiments. First, referring to FIG. 1, the configuration of a liquid treatment system, in which a mixed liquid separation apparatus of the present invention is used, will be explained as one example. As shown in FIG. 1, a liquid treatment apparatus 1 is provided with a storage tank 3 which stores a coolant 2 to be treated. The coolant 2 is sucked in through a suction pipe 4 by a liquid transport pump 5 and is sent through liquid transport piping 7 to a machine tool 8 to be fed with the coolant (arrow mark "a"). The machine tool 8 is provided with a processing machine 9 which cuts a workpiece 10. The coolant 2 which is fed to the machine tool 8 is fed through the processing machine 9 for the purpose of cooling or lubricating the cutting location of the workpiece 10 and drops down as liquid drops 2a (arrow mark "b") to be recovered inside a coolant receiver 11.

The recovered coolant 2 is contaminated with the lubricant and other oil 12 which is used for the mechanical parts of the processing machine 9 and the swarf which is produced during the cutting and other solid foreign matter 13. The mixed liquid which contains the contaminants is recovered through return piping 14 in the storage tank 3 (arrow marks "c" and "d"). Inside the storage tank 3, the oil 12, which has a smaller specific gravity and higher viscosity than the coolant 2, floats up and forms a surface layer. The oil 12 is organic matter and spoils along with the elapse of time to thereby cause degradation of the coolant 2. For this reason, the liquid treatment apparatus 1 is provided with a mixed liquid separation apparatus 6 which has the function of separating the oil 12 from the mixed liquid which contains the contaminants and prevents the oil 12 from stagnating in the storage tank 3.

The mixed liquid contains at least two types of liquid substances which differ in viscosities and specific gravities. Among these substances, the first substance constituted by the coolant 2 has on its surface a surface layer of a second substance constituted by the oil 12 with a specific gravity smaller than the first substance and a viscosity higher than it, the second substance floating on the first substance. The mixed liquid separation apparatus 6 has the function of separating and taking out the oil 12 from the mixed liquid in such a state.

Figure 2:
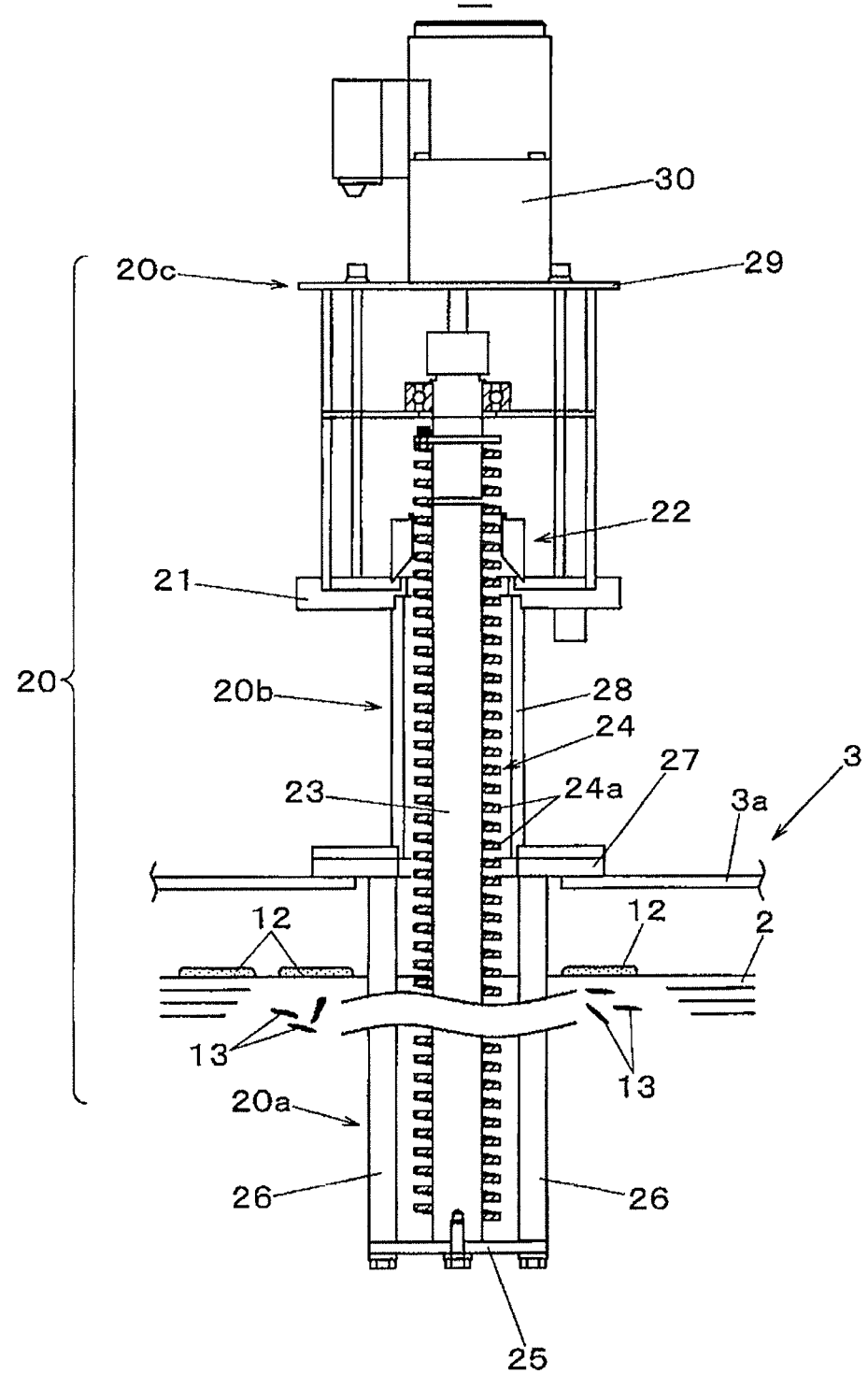
FIG. 2 is a view of the overall configuration of a mixed liquid separation apparatus of one embodiment of the present invention.

Next, referring to FIG. 2 and FIG. 3, the configuration of the mixed liquid separation apparatus 6 will be explained. As shown in FIG. 2, the mixed liquid separation apparatus 6 is configured with a vertically long liquid separation and transport part 20 which is arranged in the storage tank 3 in a vertical posture. The liquid separation and transport part 20 is provided with a bottom part 20a, intermediate part 20b, and rotation drive part 20c. The bottom part 20a is passed through an opening which is provided at the upper cover 3a of the top surface of the storage tank 3 and is immersed in the coolant 2 which is stored in the storage tank 3. A mounting member 27 which is provided at the top part of the bottom part 20a is fastened to the top surface of the upper cover 3a, whereby the mixed liquid separation apparatus 6 as a whole is attached to the storage tank 3. The coolant 2 in the storage tank 3 contains contaminants of oil 12 and solid foreign matter 13. The oil 12 is in a state floating at the surface of the coolant 2.

At the bottom part 20a and the intermediate part 20b, the liquid separation and transport part 20 is comprised of mainly a columnar rod-shaped shaft part 23 and a spiral member 24. The spiral member 24 is provided with a band member 24a with an inside end face which slidingly contacts the outer circumferential surface 23a of the shaft part 23 and circles around the outer circumferential surface in a spiral shape in several turns. Here, "in a spiral shape in several turns" indicates the band member 24a being arranged in a plurality of turns in the axial center direction of the shaft part 23. Not only the case of a single-start spiral, but also multiple-start spirals is included for the expression. At the bottom part 20a, a plurality of support rods 26 which extend downward from the mounting member 27 are used to fasten and support the bottom end part of the shaft part 23 through a coupling plate 25. The spiral member 24 is rotated relatively by the rotation drive part 20c about the fixed shaft part 23. At the bottom part 20a, the spiral member 24 is formed with an exposed region where the spaces between the turns of the band member are open to the outer circumferential side direction. At the intermediate part 20b, the spiral member 24 is surrounded in a closed manner in the outer circumferential side direction by a tubular cover member 28.

The rotation drive part 20c arranges a motor 30 in a vertical posture on the top surface of the top plate 29 and transmits rotational drive force to the spiral member 24. The bottom part 20a is immersed in the coolant 2. In that state, the rotation drive part 20c is driven to make the spiral member 24 rotate relative to the shaft part 23. Due to this, the oil 12 which floats and forms a surface layer in the coolant 2 is separated from the coolant 2 in the mixed liquid state and transported upward.

At the top end part of the intermediate part 20b, a disk-shaped receptacle 21 is attached. At the top surface of the disk-shaped receptacle 21, there is a recessed part which receives the separated and transported oil 12. At the top surface of the receptacle 21, the liquid recovery part 22 is formed and arranged in a shape so that the shaft part 23 and spiral member 24 pass through it in the vertical direction. The oil 12 which is separated by the liquid separation and transport part 20 from the coolant 2 and transported upward is recovered by the liquid recovery part 22 in the receptacle 21.

Here, referring to FIG. 3 (first embodiment), the detailed structures of the rotation drive part 20*c* and liquid recovery part 22 will be explained. The output shaft 30*a* of the motor 30 extends downward from the top plate 29 and is coupled to a vertical power transmission shaft 36 which is supported by a bearing member 34 through a coupling part 35. The bearing member 34 is held at a horizontal intermediate plate 33 which is arranged below the top plate 29. The intermediate plate 33 and the top plate 29 are supported by a plurality of connecting bolts 32 which are fixed and fastened to the peripheral edge part of the receptacle 21 (see FIG. 6(*a*)). Furthermore, between the top plate 29 and the receptacle 21, a cover member 31 which covers the inside in a closed manner is attached.

Below the intermediate plate 33, a coupling plate 37 which extends in the horizontal direction from a power transmission shaft 36 and rotates together with the power transmission shaft 36, is provided. The top end part of the spiral member 24 is fastened to the coupling plate 37 by bolts 38. The motor 30 is driven to make the power transmission shaft 36 rotate to thereby drive the spiral member 24 to rotate through the power transmission shaft 36. At this time, since the shaft part 23 is fixed and supported at the bottom end part by the coupling plate 25, the spiral member 24 rotates relative to the shaft part 23. Further, due to this relative rotation, the oil 12 which deposits on the band member 24*a* is pushed up along the outer circumferential surface 23*a* of the shaft part 23 and transported in the upward direction.

The liquid recovery part 22 which is arranged at the top end part of the shaft part 23 is configured provided with a closed surrounding member 40 which surrounds several turns (here, three turns) of the band member 24*a* in a closed manner from the outside at the top part of the spiral member 24. The closed surrounding member 40 is joined with the coupling plate 3 by a coupling rod 39 and rotates together with the power transmission shaft 36. The closed surrounding member 40 is an approximately cylindrical member which has an inner circumferential surface which slidingly contacts the outside end face of the band member 24*a*. At the surrounding range of the closed surrounding member 40, the spaces 41 between the turns of the band member 24*a* are surrounded in a closed manner from the outside. Further, the bottom part of the inner circumferential surface of the closed surrounding member 40 is taper cut wherein the end part of the outer circumferential surface becomes a bottom end part 40*a* with an acute angle cross-section. Between the bottom end part 40*a* and the bottom part 21*a* of the receptacle 21 (see FIG. 3), a clearance is secured for the oil 12 to flow out. The oil 12 which moves upward by the liquid separation and transport part 20 and reaches the liquid recovery part 22 enters the closed surrounding member 40. Due to the push-up action of the band member 24*a*, the oil 12 is discharged from the top surface side of the closed surrounding member 40 and from the clearance between the bottom end part 40*a* and the bottom surface 21*a*, and the oil 12 is recovered at the receptacle 21.

Figure 4:
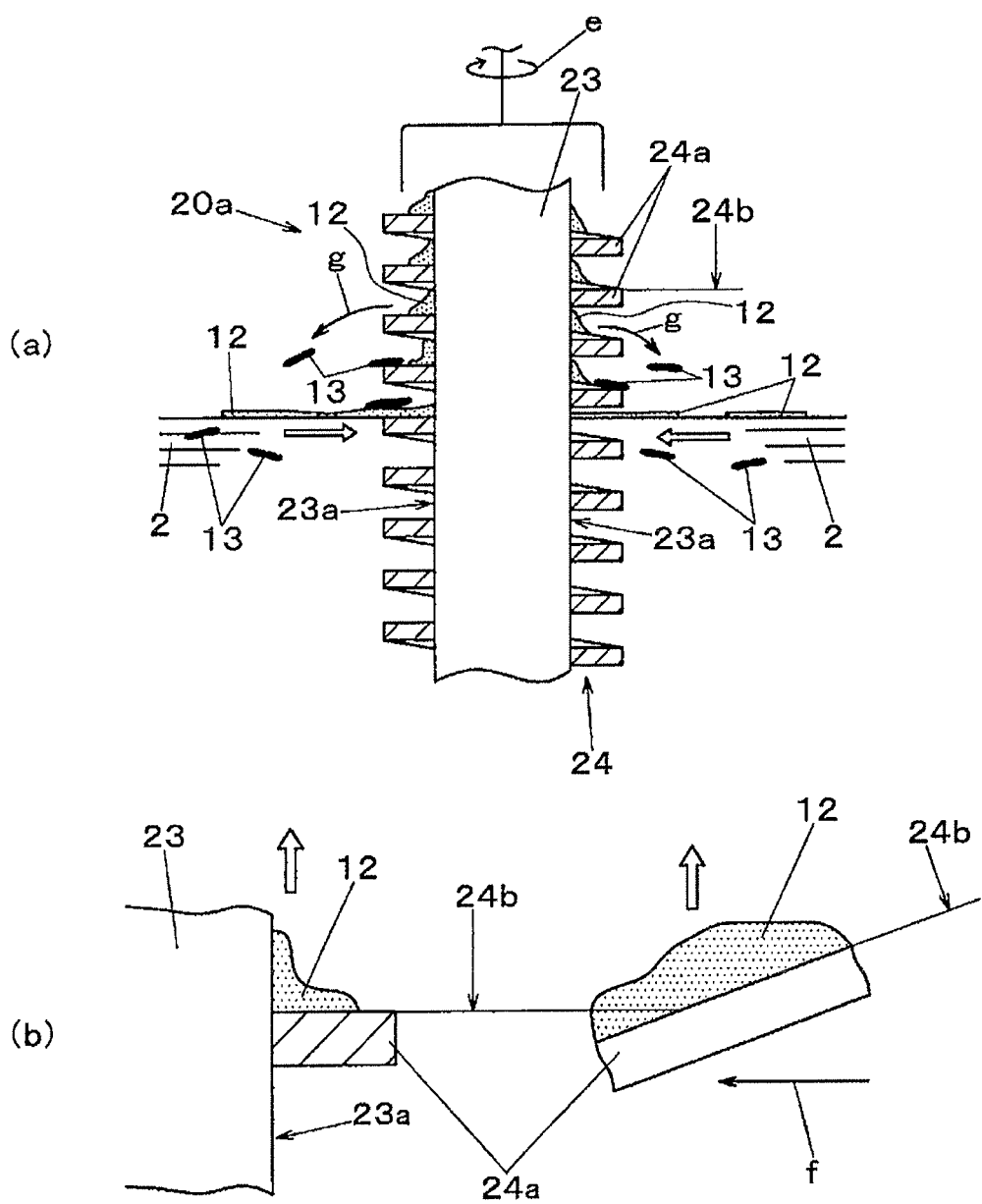
FIGS. 4(a) and (b) are explanatory views for explaining the functions of a liquid separation and transport part in the mixed liquid separation apparatus of one embodiment of the present invention.

Referring to FIG. 4, the operation of moving the oil 12 by the combination of the shaft part 23 and spiral member 24 at "the liquid separation and the transport part 20", will be explained. FIG. 4(*a*) shows the state where the bottom part of the bottom part 20*a* is immersed in the coolant 2. At the surface layer of the coolant 2, the oil 12 is present in a floating state. Further, the solid foreign matter 13 floats in the coolant 2. Further, the oil 12 is high in viscosity and easily deposits, so deposits on the top surface 24*b* of the band member 24*a* or the outer circumferential surface 23*a* of the shaft part 23 positioned near the surface of the coolant 2 along with the surrounding solid foreign matter 13.

In this state, the rotation drive part 20*c* is used to make the spiral member 24 rotate in a predetermined rotation direction (arrow mark "e") whereby the oil 12 which deposits on the top surface 24*b* and outer circumferential surface 23*a* is acted on by a push-up action making it move upward along the outer circumferential surface 23*a*. That is, as shown in FIG. 4(*b*), the band member 24*a* turns around the outer circumferential surface 23*a* in the horizontal circumferential direction (arrow mark "f") whereby a force acts on the oil 12 making it move upward by the top surface 24*b*. Due to this, the oil 12 is pushed upward along the outer circumferential surface 23*a*.

Figure 3:
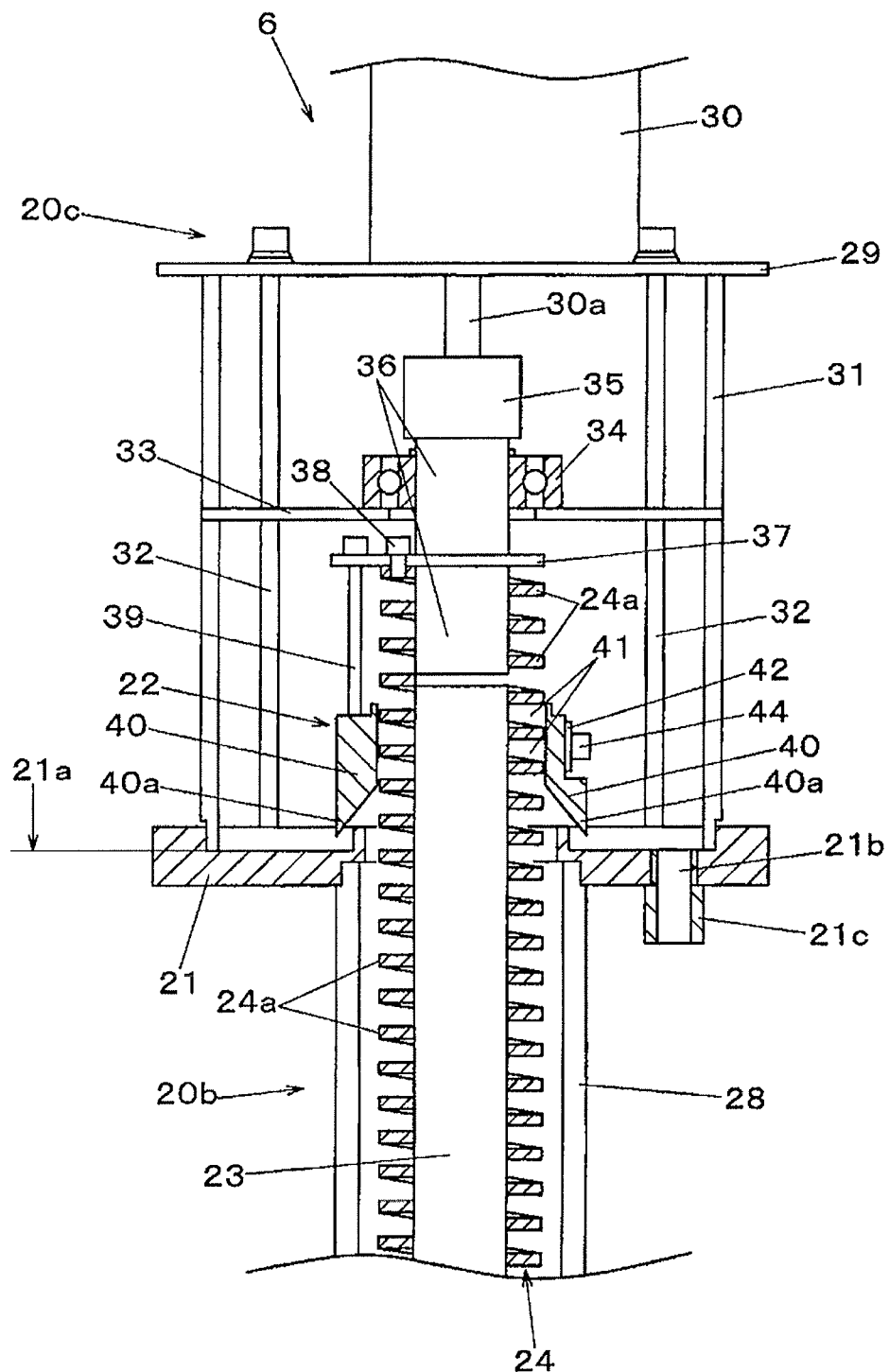
FIG. 3 is a partial cross-sectional view of a mixed liquid separation apparatus of one embodiment of the present invention (first embodiment).

At this time, at the bottom part 20*a*, the spiral member 24 forms an exposed range, where the spaces 41 between the turns of the band member 24*a* are opened to the outer circumferential side direction (see FIG. 3). Due to the above-mentioned push-up operation, the solid foreign matter 13, which deposits on the top surface 24*b* and is present in the spaces 41, separates from the spaces 41 which are opened at the outer circumferential side and drops down (arrow mark "g") in the process of upward movement. In other words, in this exposed range, it is not obstructed to eject the solid foreign matter 13, which is transported upward together with the oil 12, from the spaces 41 to the outside. Due to this, it is possible to suppress the inconvenience which the solid foreign matter 13 caused in the prior art, that is, the inconvenience where solid foreign matter 13 is caught in the sliding contact parts with the guide partition and clogs them.

Further, the present embodiment employs a configuration to drive rotation of the spiral member 24 on the outer circumferential side of the fixed shaft part 23, so a ring-shaped fluid motion is caused by a trail-along effect at the nearby coolant 2 along with rotation of the spiral member 24. Further, due to this ring-shaped fluid motion, there is increased probability that the oil 12, which floats at the surface layer of the coolant 2, approaches the band member 24*a* or outer circumferential surface 23*a* and is deposited to them or trapped by them. It becomes possible to improve the separation efficiency of the oil 12.

Figure 5:
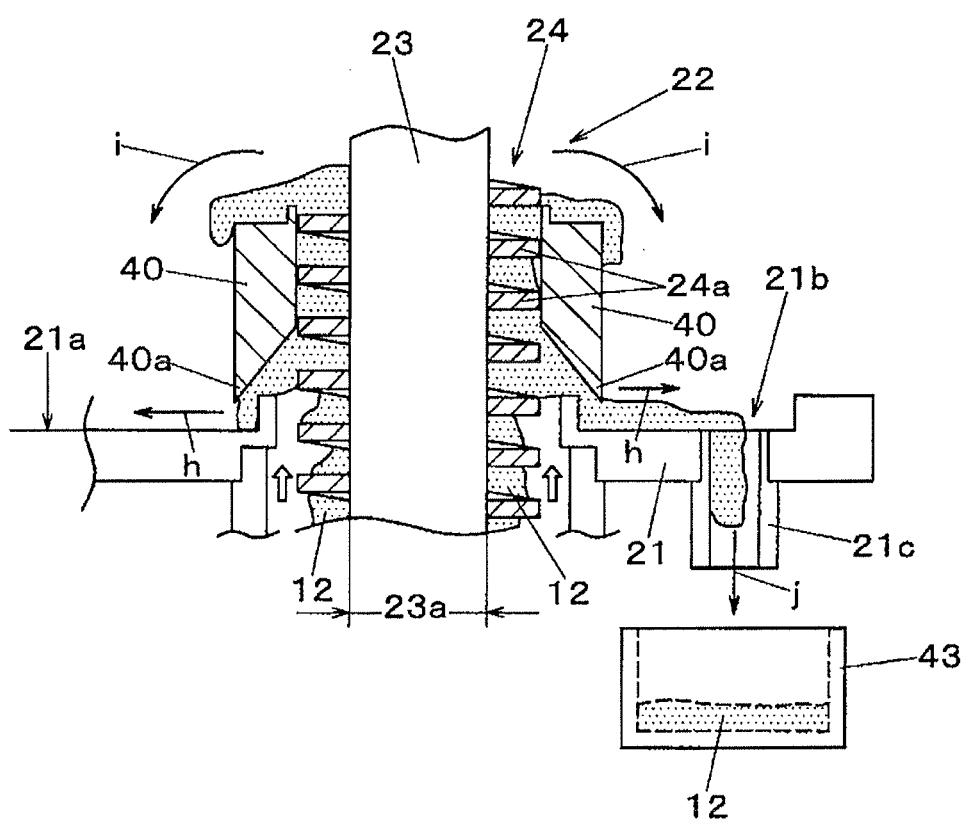
FIG. 5 is an explanatory view for explaining the functions of a liquid recovery part in the mixed liquid separation apparatus of one embodiment of the present invention.

Next, referring to FIG. 5, details of the function of the liquid recovery part 22 will be explained. The oil 12, which is trapped at the bottom part 20*a* by the band member 24*a* and moves upward by the intermediate part 20*b*, moves upward through the inside of the closed surrounding member 40 when reaching the liquid recovery part 22. At this time, the spaces 41 between the turns of the band member 24*a* are surrounded in a closed manner by the closed surrounding member 40, so free fluid motion to the outside is obstructed.

For this reason, the upward moving oil 12 is recovered in the receptacle 21 through the clearances between the bottom end part 40*a* of the closed surrounding member 40 and the bottom surface 21*a* of the receptacle 21, by the two paths (discharge parts) of the downward discharge path (arrow mark "h") where it is discharged to the bottom surface 21*a*, or, of the overflow path (arrow mark "i") where it is lifted up to the top surface of the closed surrounding member 40 by the band member 24a and overflows. Near the outer circumference of the receptacle 21, a guide pipe 21c which extends downward and a communicated ejection port 21b, are provided. The oil 12 which is recovered in the receptacle 21 is guided through the ejection port 21b to the guide pipe 21c where it drops down into the recovery box 43 arranged below it and is recovered.

Figure 6:
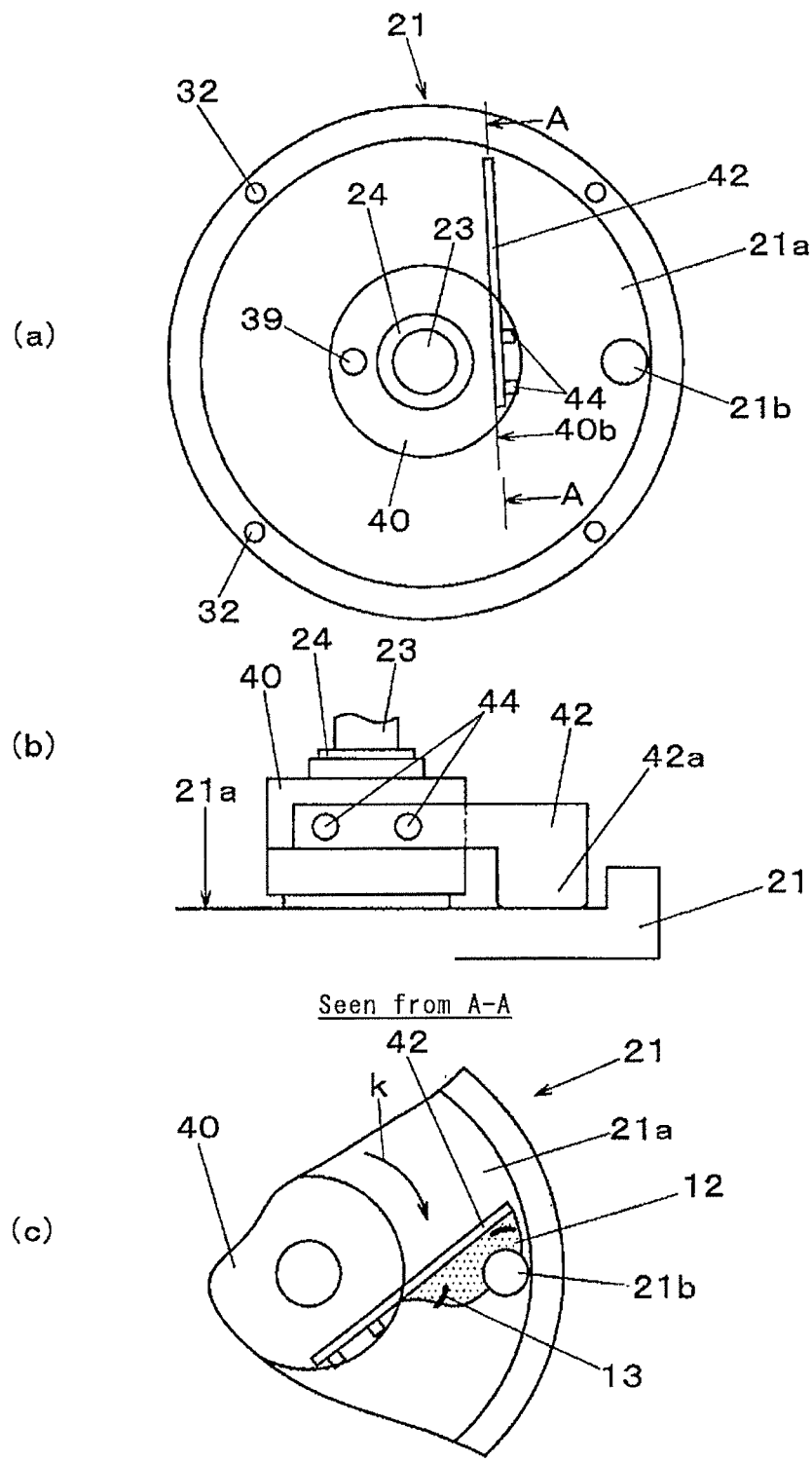
FIGS. 6(a) to (c) are explanatory views for explaining the configuration and functions of a foreign matter ejection part in a mixed liquid separation apparatus of one embodiment of the present invention, wherein (b) is a partial view seen from the arrow mark of line A-A of (a).

Next, referring to FIG. 6, the configuration and function that the foreign matter ejection part ejects the solid foreign matter 13 which is contained in the oil 12 recovered in the receptacle 21, will be explained. The ejection port 21b, which is provided at the bottom surface 21a of the receptacle 21, serves also as an ejection port for ejecting downward the solid foreign matter 13 which is discharged from the liquid recovery part 22 together with the oil 12. That is, as shown in FIGS. 6(a) and (b), a plate-shaped scraping member 42 with a sliding contact part 42a provided at the end part, is fastened by bolts 44 to a mounting surface 40b which is formed by partially cutting the side face of the closed surrounding member 40. The scraping member 42 is arranged inside the receptacle 21 with the sliding contact part 42a in sliding contact with the flat bottom surface 21a. The closed surrounding member 40 is coupled to the coupling plate 37 (see FIG. 3) through a connecting rod 39. Due to the relative rotation of the rotation drive part 20c, the closed surrounding member 40 rotates. Due to this, the scraping member 42 slidingly contacts the bottom surface 21a by the sliding contact part 42a to slide in the rotation direction.

As shown in FIG. 6(c), if the closed surrounding member 40 rotates (arrow mark "k"), the scraping member 42 which slidingly contacts the bottom surface 21a is used to scrape together the solid foreign matter 13 and the oil 12 on the bottom surface 21a, and to eject them downward through the ejection port 21b. A foreign matter ejection part has the closed surrounding member 40 which is driven to rotate by the rotation drive part 20c, and the scraping member 42 which is attached to the closed surrounding member 40, and the foreign matter ejection part transports and ejects the solid foreign matter 13 to the ejection port 21b in the receptacle 21. That is, this foreign matter ejection part has the scraping member 42 which slidingly contacts the flat bottom surface 21a of the receptacle 21 and slides over the bottom surface 21a by relative rotation of the rotation drive part 20c. Due to this scraping member 42, the solid foreign matter 13 on the bottom surface 21a is scraped together at the ejection port 21b.

Figure 7:
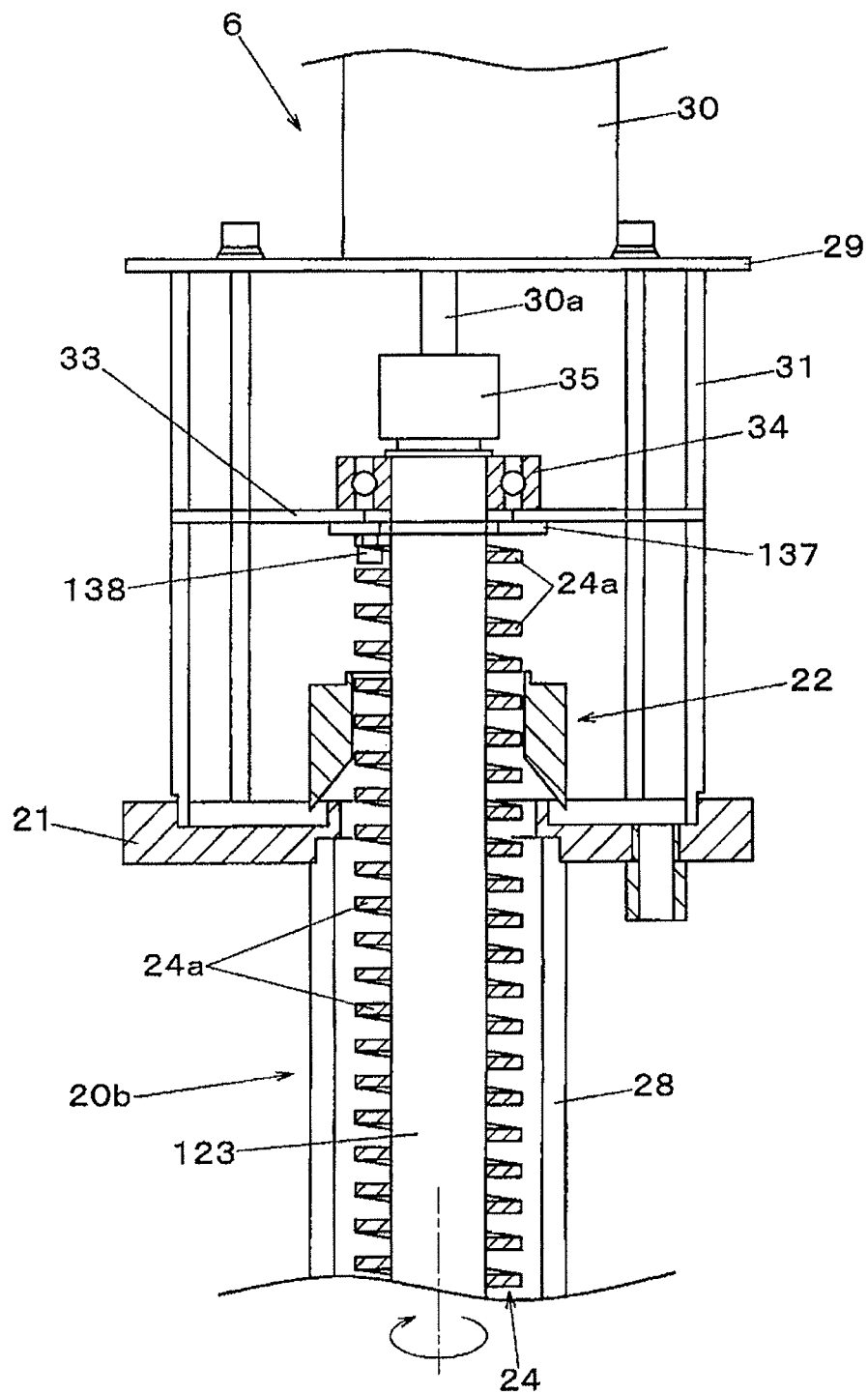
FIG. 7 is a partial cross-sectional view of a mixed liquid separation apparatus of one embodiment of the present invention (second embodiment).

In the first embodiment in the above embodiments, as the rotation drive part 20c which makes the spiral member 24 and the shaft part 23 rotate relative to each other, a configuration making the spiral member 24 rotate with respect to a fixed shaft part 23, is employed, but it is also possible to make the shaft part 23 rotate with respect to a fixed spiral member 24. For example, as shown in FIG. 7, the shaft part 23 is directly coupled with the output shaft 30a of the motor 30 through the coupling part 35, while the spiral member 24 is fastened and joined by bolts 138 and the fixed plate 137 to the intermediate plate 33. Due to this configuration as well, the spiral member 24 and the shaft part 123 can be made to rotate relative to each other. In the same way as the first embodiment, the spiral member 24 can be used to push up the oil 12 along the outer circumferential surface of the shaft part 123.

As explained above, the mixed liquid separation apparatus 6 in the present embodiment is an apparatus for separating and taking out oil 12 from a mixed liquid, wherein the oil 12, i.e. the second substance, floats on a surface of the coolant 2, i.e. the first substance and forms a surface layer of the oil 12 with a smaller specific gravity than the first substance and a higher viscosity than it. The liquid separation and transport part 20 is arranged in a vertical posture with its bottom part 20a inserted into the storage tank 3 which stores the mixed liquid, separates the oil 12 from the coolant 2 and transports it upward. The liquid separation and transport part 20 comprises a columnar rod-shaped shaft part; a spiral member which is provided with a band member with an inside end face which slidingly contacts the outer circumferential surface of the shaft part and circles around the outer circumferential surface in a spiral shape in several turns; and a rotation drive part which makes the spiral member and the shaft part rotate relative to each other. Due to this, it is made possible to push up the second substance which is deposited on the band member by relative rotation along the outer circumferential surface of the shaft part.

Due to this, it is possible to suppress the issue of solid foreign matter 13 being caught in and clogging the mechanism. Furthermore, it becomes possible to improve the system efficiency due to the mixed liquid separation apparatus 6 and possible to prevent poor operation or abnormal wear due to foreign matter being caught. That is, it is possible to realize low cost, high liquid separation efficiency for a mixed liquid which contains swarf, sludge, or other solid foreign matter 13.

Note that, in the above embodiments, the example is shown where the first substance is the coolant 2 and the second substance is the oil 12 which float at the surface of the coolant 2, but the present invention is not limited to these. If configured to separate and take out a second substance from a mixed liquid in a state where the first substance is formed on its surface with a surface layer of a second substance with a specific gravity smaller than the first substance and a viscosity higher than it, the second substance floating on it, the present invention can also be applied to combinations of other types of substances. For example, the present invention can also be applied to a combination of a first substance of a washing solution and a second substance of a washed substance which floats on the surface of the washing solution.

INDUSTRIAL APPLICABILITY

The mixed liquid separation apparatus of the present invention covers a mixed liquid which contains swarf, sludge, or other solid foreign matter and has the effect that it can realize a low cost, high liquid separation efficiency. It is useful in the liquid treatment field of recovering and reusing a coolant which is used in a machine tool or a washing liquid which is used in a washing apparatus. The present invention was explained with reference to specific embodiments selected for the purpose of illustration, but to a person skilled in the art, it is clear that numerous modifications can be made without departing from the basic concept of the present invention and its scope of disclosure.

REFERENCE SIGNS LIST 1. liquid treatment apparatus
2 coolant
3 storage tank
6 mixed liquid separation apparatus
12 oil
13 solid foreign matter
20 liquid separation and transport part 20a bottom part
20c rotation drive part
21 receptacle
21a bottom surface
21b ejection port
22 liquid recovery part
23 shaft part
23a outer circumferential surface
24 spiral member
24a band member
40 closed surrounding member
41 space
42 scraping member

The invention claimed is:

1. A mixed liquid separation apparatus for separating and taking out a second substance from a mixed liquid containing at least two types of liquid substances with different viscosities and specific gravities, wherein said second substance floats on a surface of a first substance among said liquid substances and forms a surface layer of said second substance with a specific gravity smaller than said first substance and a viscosity higher than said first substance, comprising a liquid separation and transport part, which is arranged in a vertical posture with a bottom part inserted into a storage tank which stores said mixed liquid, separates said second substance from said first substance and transports said second substance upward, and a liquid recovery part which recovers said transported second substance in a receptacle, wherein said liquid separation and transport part comprises a columnar rod-shaped shaft part, a spiral member which is provided with a band member with an inside end face, wherein said inside end face slidingly contacts an outer circumferential surface of said shaft part and said spiral member circles around said outer circumferential surface in a spiral shape in several turns, and a rotation drive part which makes said spiral member and said shaft part rotate relative to each other, and wherein said second substance deposited on said band member is pushed up by said relative rotation along said outer circumferential surface of said shaft part.

2. The mixed liquid separation apparatus according to claim 1, wherein said liquid recovery part comprises a closed surrounding member which slidingly contacts outside end faces of a predetermined number of turns of the band member at the top part of said spiral member, and surrounds the spaces between the turns of said band member from the outside to close them and discharge parts which discharge the second substance from said spaces to a receptacle.

3. The mixed liquid separation apparatus according to claim 2, wherein at said spiral member below said liquid recovery part, an exposed region where the spaces between turns of said band members are opened to the outer circumferential side direction is provided, and at that exposed region, ejection of solid foreign matter which is transported upward together with said second substance, from said spaces to the outside, is not obstructed.

4. The mixed liquid separation apparatus according to claim 2, wherein said receptacle is provided with an ejection port for ejecting solid foreign matter which is discharged together with said second substance downward.

5. The mixed liquid separation apparatus according to claim 4 wherein said receptacle is provided with a foreign matter ejection part which transports said solid foreign matter to said ejection port where it is ejected.

6. The mixed liquid separation apparatus according to claim 5, wherein said foreign matter ejection part has a scraping member which slidingly contacts a flat bottom surface of said receptacle and slides over said bottom surface by relative rotation of said rotation drive part, and this scraping member is used to scrape together solid foreign matter on said bottom surface to said ejection port.

7. The mixed liquid separation apparatus according to claim 1, wherein said spiral member rotates and said shaft part is fixed.

8. The mixed liquid separation apparatus according to claim 1, wherein said shaft part rotates and said spiral member is fixed.

9. The mixed liquid separation apparatus according to claim 1, wherein said first substance is a coolant, and said second substance is an oil which floats at a surface of said coolant.

10. The mixed liquid separation apparatus according to claim 1, wherein said first substance is a washing liquid, and said second substance is a washed substance which floats at a surface of said washing liquid.

* * * * *